United States Patent [19]
Brock et al.

[11] 3,943,566
[45] Mar. 9, 1976

[54] DYNAMIC SKEW CORRECTION FOR ROTATING HEAD MAGNETIC RECORDER

[75] Inventors: George W. Brock, Boulder; Ernest P. Kollar, Longmont; Michael L. Nettles, Boulder, all of Colo.

[73] Assignee: International Business Machines Corporation, Armonk, N.Y.

[22] Filed: July 17, 1974

[21] Appl. No.: 489,194

[52] U.S. Cl. .................. 360/71; 360/84; 360/130
[51] Int. Cl.² G11B 15/26; G11B 15/60; G11B 5/48
[58] Field of Search ........... 360/71, 130, 77, 76, 73, 360/84, 75, 70; 242/76, 189, 192, 190, 184, 186

[56] References Cited
UNITED STATES PATENTS

| 2,919,314 | 12/1959 | Holt | 360/84 |
|---|---|---|---|
| 3,319,014 | 5/1967 | Sugawa | 360/130 |
| 3,636,275 | 1/1972 | Sato et al. | 360/130 |
| 3,679,840 | 7/1972 | Maxey | 360/84 |
| 3,691,315 | 9/1972 | Ellmore | 360/84 |
| 3,845,500 | 10/1974 | Hart | 360/77 |

Primary Examiner—Alfred H. Eddleman
Attorney, Agent, or Firm—Homer L. Knearl

[57] ABSTRACT

Parallelism between the track on magnetic tape and the path of the rotating head is dynamically adjusted and maintained by adjusting one or both of the entry or exit guides guiding the tape as it helically wraps a mandrel. The mandrel has two halves that flank the rotating head so that as the tape wraps the mandrel, the rotating head traverses the tape at an oblique angle. Skew error is represented by a lack of parallelism between the track on the tape and the path of the rotating head across the tape. The skew error may be corrected by laterally shifting either the entry or exit tape edge guide without distorting the track over a limited lateral range of movement by the guides. The entry and exit edge guides are continuouscompliant air-bearing guides. Similarly, the mandrel that supports the tape adjacent the rotating head is also air bearing.

19 Claims, 9 Drawing Figures $$P_F = \frac{T}{R}$$

DYNAMIC SKEW CORRECTION FOR ROTATING HEAD MAGNETIC RECORDER

CROSS REFERENCE TO RELATED APPLICATION

Detection of head to track alignment to provide a skew error signal to the present skew error correction invention can be accomplished a number of ways, but is preferably accomplished as described in copending commonly assigned U.S. Pat. application, Ser. No. 415,080, filed Nov. 12, 1973, now U.S. Pat. No. 3,845,500, entitled "Head to Track Alignment in a Rotating Head Magnetic Tape Unit" by G. A. Hart.

BACKGROUND OF THE INVENTION

1. Field of the Invention

This invention relates to a rotating head magnetic tape drive. More particularly, the invention relates to method and apparatus for dynamically correcting skew error between the transverse track on the magnetic tape and the path of the rotating head.

2. Discussion of Prior Art

The problem of skew error correction in cross tape magnetic recording is quite old. It commonly arises with regard to two environments. First, static adjustments have been made to bring the tape into proper alignment with the rotating head and the mandrel that supports the tape along the path of the rotating head. An example of such a teaching in U.S. Pat. No. 3,697,676, entitled "Head to Tape Alignment Apparatus and Method," invented by Arthur I. Protas.

The Protas patent teaches that parallelism between the tracks on the tape and the path of the rotating head may be adjusted in a static manner by moving either an entry or exit post guide that guides the tape onto or off of the rotating-head mandrel. Once the parallelism between the path of the magnetic head and track is statically adjusted, moving the parallel track into alignment with the head is accomplished by moving both guides laterally relative to the rotating-head mandrel. Static adjustment of the guide, as herein referred to, means that the guide is moved once during a long period of time manually by an operator. This is in contrast to a dynamic skew error correction which would be accomplished by an automatic system moving edge guides continuously or repeatedly over a short time interval to maintain parallelism between the track and the path of the rotating head.

Another rotating-head recording environment in which it is desirable to change the angle of the track on a tape to bring it into parallelism with the path of the rotating head is in converting from a stop mode to a slew mode operation. In stop mode recording operation in a rotating head magnetic recorder the tape is held stationary as the rotating head sweeps a single time or repeatedly over a single track. In slew mode the tape moves continuously and is synchronized in speed with the rotational speed of the head so as to control the angle that the path of the head makes with the longitudinal dimension of the tape. Clearly, to switch from a stop mode to a slew mode of operation would require a change in the angle of the track on the tape to maintain parallelism between the track and the path of the rotating head.

Apparatus for adjusting tape path to handle this type of track angle realignment is taught in U.S. Pat. No. 3,376,395, issued to W. L. Rumple. The Rumple patent shows crowned pulleys to guide the tape onto the rotating-head mandrel. The mandrel itself has fixed guides mounted thereon and is adjustable laterally and statically to change the separation of the fixed guides. When the Rumple magnetic recorder is switched to a stop mode (tape stationary during read or write) operation, the fixed mandrel guides are moved farther apart. The crown pulley entry and exit guides then cause a shift in tape angle across the mandrel as the tape moves between the fixed guides spaced farther apart. The shift in tape angle across mandrel changes the track angle relative to the path of the rotating head. The adjustment in the Rumple patent is a manual adjustment by an operator at the time the conversion between stop and slew mode is made.

Dynamic adjustment of entry or exit guides for tape helically wrapping a mandrel has not been done in the past because it was well accepted in the art that to do so would distort the recorded track. The reason for the distortion is the geometry of the tape path relative to the rotating-head mandrel. This geometry controls whether there is equal or unequal tension across the width of the tape as the tape wraps the mandrel. For example, if the tape helically wraps the mandrel 360°, the angle at which the mandrel should be positioned relative to the longitudinal dimension of the tape is given by the expression $\sin \theta = G_s/C$ where $G_s$ is the guide spacing (distance between the same edge on the entry and exit guides) and C is the circumference of the mandrel. This angle also corresponds to the acute angle of a track written by the rotating head relative to the edge of the magnetic tape.

It was well accepted in the art that if the guide spacing were to change without changing the angle $\theta$ between the mandrel and the tape, an unequal tension distribution would exist across the width of the tape. This unequal tension in the tape would cause the tape to distort and consequently, a written track on the tape would distort relative to the path of the rotating head. This expected distortion will be discussed further hereinafter.

The problem of distortion is heightened by the use of wide magnetic tape. As the ratio of L to W (where L is the length of tape between the entry and exit guides and W is the width of the tape) goes down, the problem of nonuniform tape tension and associated track distortion with changes in guide spacing becomes acute. Typically, the prior art L to W ratios have been in the order of 20 or even 30 to 1. A high L to W ratio helps to eliminate the sensitivity of the track distortion to guide spacing at the penalty of giving up information storage capacity on the tape. The storage capacity of the tape goes down as the width of the tape decreases. When the length to width ratio goes below 10 to 1, the track distortion problem becomes serious and can cause a rotating head to misread data from distorted adjacent tracks crossing the path of the head.

The need for dynamically adjusting guide spacing is due to skew error. Skew error is caused by tendency of magnetic tape to change its physical characteristics under different environmental conditions. It is well known that humidity and temperature affect the magnetic tape to the extent it may change its length and width. These changes are small; however, when dealing with high density tracks written across a wide magnetic tape, they can cause a significant skew error, i.e., lack of parallelism between the tracks on the tape and the path of the rotating head. Therefore, there is a primary need to handle the skew error correction problem by dynamically adjusting the edge guiding of magnetic tape as it helically wraps the mandrel without, at the same time, introducing distortion into the tracks on the tape.

SUMMARY OF THE INVENTION

In accordance with this invention, tape wrapping a rotating-head mandrel is edge guided for skew error correction without distorting the track on the tape by dynamically edge guiding the tape immediately before and immediately after the length of tape that wraps the path of the rotating head. Further, support of the tape in the region where the tape wraps the path of the rotating head is air bearing, whereby unequal tension distributions across the width of the tape tend to redistribute themselves. In an environment where the ratio of length of tape between guides to width of tape is less than 10 to 1, the guide spacing has been changed over a range of 20 mils without distorting a track on the tape. Instead, the track has rotated without distortion so that the track is brought into a parallel relationship with the path of the rotating head.

As an additional feature of the invention, the edge guides may be implemented by utilizing long, continuous compliant edge guides usually having a length at least equal to the width of the tape. These guides also have an air bearing surface to support the tape as it is edge guided. The function of the continuous guide is to prevent concentration of discrete edge forces. Discrete edge forces would tend to distort the tape when edge guiding forces are applied to change the angle of tape and thus the angle of the track. Also, a characteristic of a long, continuous compliant edge guide is that it assists uniform tension distribution across the width of a guided tape.

As a further feature of the invention, the dynamic tape guidance is implemented by detecting the parallelism between a track on the tape and the path of the rotating head, and thereafter control circuitry activates electro-mechanical devices to move one or both of the edge guides to bring the track back into parallelism with the path of the rotating head. In addition to corrections for skew error, preset correction values may be gated into the control circuitry to selectively position the guides for slew mode or stop/incremental mode operation. During stop/incremental mode the tape is stationary during reading or writing operations.

The great advantage of our invention is that it permits a rotating-head magnetic tape drive to dynamically adjust itself to different track angles on the tape. By so doing, the temperature, humidity environment that the tape is stored in need not be as strict, and the tolerances on tape drives need not be as tight. Stated another way, changes in dimensions of the tape caused by temperature and humidity can be accommodated by dynamic skew correction of the invention. Also, tapes may easily be interchanged between tape drives without tight tolerances between tape paths on separate tape drives. Further, because of the ability of the invention to assure accurate parallelism between data track and the path of the rotating head, the track widths can be smaller. With smaller track widths the track density, and thus the data density on the tape, can be increased.

The foregoing and other features and advantages of the invention will be apparent from the following more particular description of preferred embodiments of the invention, as illustrated in the accompanying drawings.

DETAILED DESCRIPTION OF PREFERRED EMBODIMENTS

Figure 1:
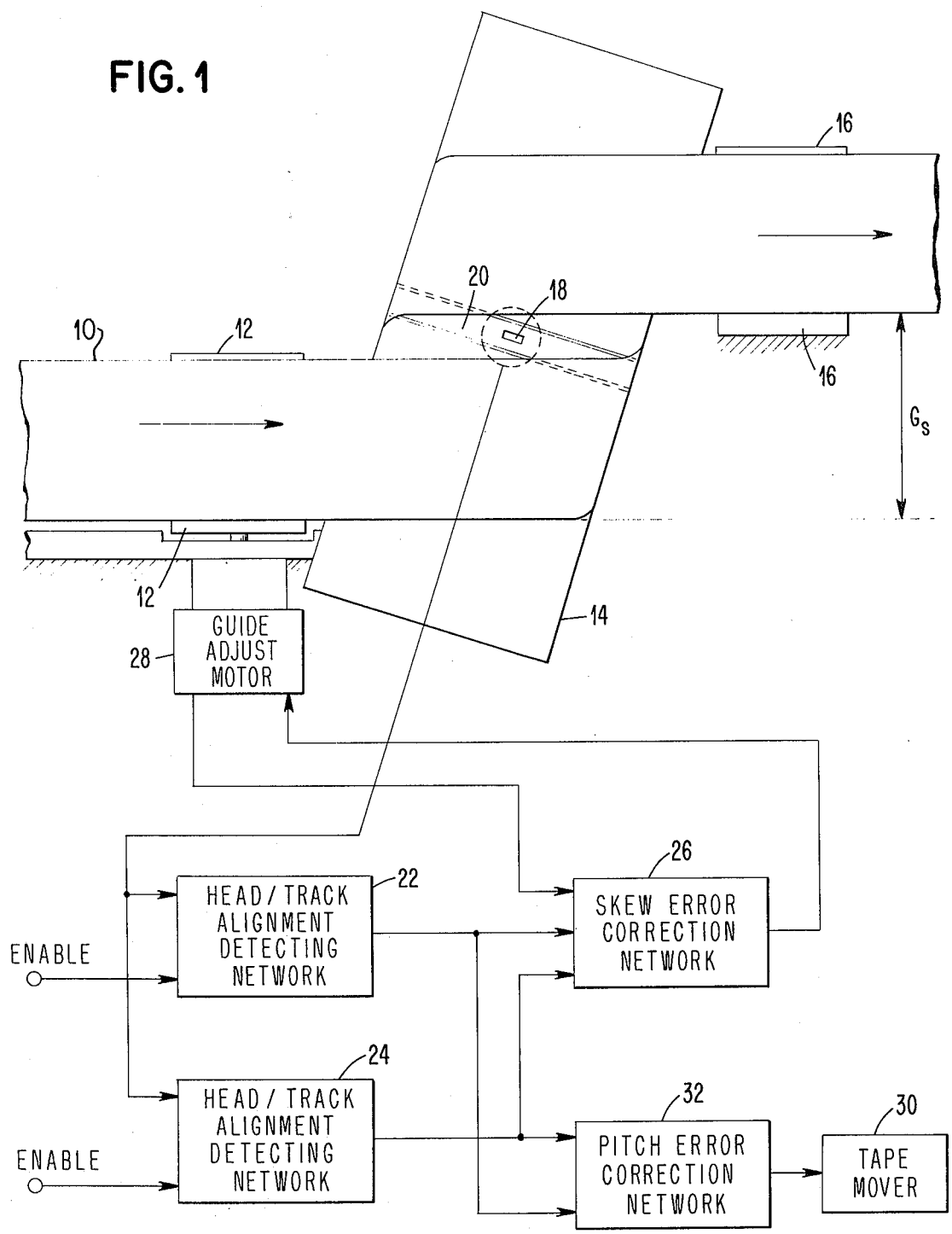
FIG. 1 shows one preferred embodiment of the invention wherein the magnetic tape helically wraps a mandrel 360°, and the entry guide is adjusted in position dynamically in response to head-track alignment detection by monitoring the signal from the rotating head.

In the preferred embodiment shown in FIG. 1, tape 10 is moving from left to right as it crosses the adjustable guide 12, helically wraps the mandrel 14, and exits across guide 16. Rotating head sweeps obliquely across the tape as the tape wraps the mandrel 14 360°. The angle theta of the track on the tape is given by the expression sin $\theta$ = the guide spacing $G_s$ divided by effective circumference of the mandrel 14. Guide spacing $G_s$, as shown in FIG. 1 is the spacing between the fixed edge of guide 12 and the fixed edge of guide 16.

When the tape is wrapped 360°, the expression sin $\theta$ = $G_s/C_E$ also gives the angle of the mandrel axis relative to the axes of the cylindrical guides 12 and 16. At this mandrel angle, the tape will helically wrap the mandrel, and at the same time have a uniform tension distribution across the width of the tape. If the guide spacing $G_s$ is changed without changing the mandrel axis angle relative to the axes of the guides, then wrap of the tape about the mandrel will not be natural helix and will induce non-uniform tension distribution across the width of the tape. It is this non-uniform tension distribution which would cause a distortion in the shape of the track written by the rotating head 18. This problem is discussed hereinafter in more detail with reference to FIGS. 3a and 3b.

In FIG. 1 the problem of track distortion when the guide spacing is changed does not exist, probably for a number of reasons which are not now completely understood. It is likely that a major reason is the fact that the mandrel 14 is air-bearing and aids the tape in redistributing the tension across the width of the tape when the guide spacing changes.

The air bearing mandrel might be achieved a number of ways as, for example, by making the mandrel from a porous ceramic through which air may be forced from an inner plenum chamber in the mandrel. Alternatively, the mandrel might have a pattern of holes spaced about the mandrel along the path of the tape.

In addition, the rotor 20 which carries the magnetic head 18 would also be air-bearing. The rotor would be air-bearing either by a hydrodynamic bearing created by its own motion, or by an additional hydrostatic bearing. In other words, the rotor motion could create a hydrodynamic air bearing, but alternatively, air could be forced through the surface of the rotor to provide a hydrostatic air bearing.

A schematic representation of electronic controls to adjust the guide 12 is also shown in FIG. 1. In the preferred embodiment, the rotating head 18 picks up track servo information from servo tracks located at each edge of the magnetic tape 10. The servo tracks and the head/track alignment detecting networks 22 and 24 are fully described in U.S. Pat. No. 3,845,500, previously identified under the heading "Cross Reference to Related Application."

Briefly, these detecting networks 22 and 24 detect whether the head 18 is properly aligned with an oblique track at each end of the track. The output from each alignment detecting network is a plus or minus count indicating the departure of the head from alignment with the center of the oblique data track at each end of the track. With the position of each end of the data track known, it is possible then to calculate the skew error or lack of parallelism between the track and the path of the rotating head by merely taking the difference between the count from alignment detecting network 22 and from alignment detecting network 24.

The alignment detecting networks are initialized or enabled in accordance with the position of the magnetic head along its rotary path. Detecting network 22 is enabled while the head moves across the servo track adjacent the entry edge of tape 10. The entry edge is the edge crossed by the magnetic head as it starts to scan across the tape. Alignment detecting network 24 is enabled while the head moves across the servo track adjacent the exit edge of tape 10.

To determine the skew error, the count from alignment detector 22 would be subtracted from the count from alignment detector 24. A positive difference count for the skew error would indicate the track is skewed counterclockwise relative to the path of the rotating head. A negative difference count for the skew error would indicate the track is skewed clockwise relative to the path of the rotating head.

The skew error correction network 26 performs the subtraction operation to arrive at the skew error. The skew error network 26 then generates a drive signal for the guide adjust motor 28. The motion by the motor, and thus the guide 12, is monitored by the skew error correction network until the correct adjustment has been made to eliminate the skew error.

Skew error correction network 26 may also be used to compensate for preset skew errors. This would be desirable in a situation where the tape drive was being switched between a stop mode of operation and a slew mode of operation. Also, the introduction of a preset skew error might be useful to compensate for a slight permanent angular misalignment between mandrel 14 and guides 12 and 16.

In FIG. 1 the counts from the alignment detecting networks 22 and 24 may also be used to control the tape mover 30 to move the tape to a point where a track is centered over the path of the rotating head. Position error or pitch error correction is made by the pitch error correction network 32 which averages the two counts from alignment detecting networks 22 and 24. The skew error correction network provides a correction signal to make the track parallel to the path of the rotating head, while the pitch error correction network provides an error signal which can be used to center the track on the path of the rotating head. The pitch error correction network 32 and the tape mover 30 are not a part of the present invention. Pitch error correction is shown to complete an understanding of the environment in which the skew error correction network might be used.

Figure 2:
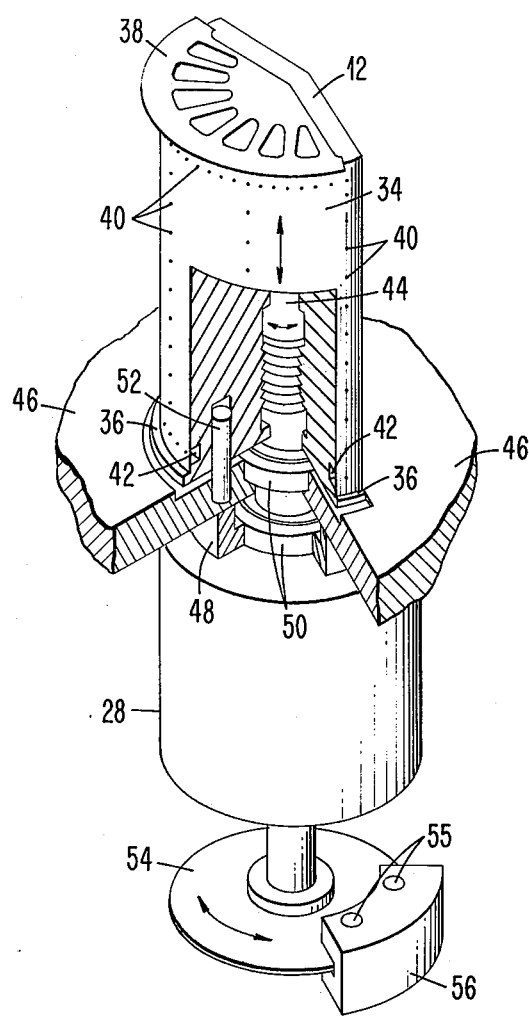
FIG. 2 shows an example of a long, continuous compliant guide with a guide adjust motor which can be used to provide the adjustable entry guide in FIG. 1.

The adjustable guide 12 and its associated guide adjust motor 28 are shown in detail in FIG. 2. Guides 12 and 16 of FIG. 1 are identical except that guide 12 is mounted so that it may be laterally adjusted by the guide adjust motor 28. Both of the guides 12 and 16 take the form of a cylindrical air-bearing support surface 34 with a fixed edge guide 36 at one edge and a compliant edge guide 38 at the other edge. The air bearing surface for the guides is provided by holes 40 in the support surface 34. Channels 42 under each row of holes provide air under pressure to the holes. The air passes through the holes and provides air pressure between the tape and the surface of the support 34 so as to support the tape with an air bearing above the surface 34 of the guides 12 and 16.

Tape moves across the guides 12 and 16 by being wrapped approximately 90° to 180° about the air bearing surface 34 before it enters or exits from the mandrel in FIG. 1. The fixed edge 36 of the guides provides a reference surface for guiding, while the compliant edge 38 biases the tape uniformly against the fixed edge 36. The function of a continuous compliant guide is discussed in more detail in copending application Ser. No. 335,609, filed Feb. 26, 1973, now U.S. Pat. No. 3,845,500, entitled "Continuous Compliant Guide for Moving Web."

To adjust the guide 12 laterally so as to change the guide spacing $G_s$ in FIG. 1, motor 28 is driven by an error correction signal from the skew error correction network 26 in FIG. 1. The shaft 44 of the motor 28 is threaded and engages threads inside the guide 12. Accordingly, since the motor is fixed in position, a rotation of the shaft 44 will cause the guide 12 to move linearly and thus permit adjustment of guide spacing $G_s$.

Motor 28 is attached to mounting wall 46 via the annular bracket 48. Bushings 50 guide the shaft 44 of the motor, and at the same time permit it to rotate relative to the mounting wall 46. Mounting wall 46 also contains pins 52 (one shown) to steady the guide 12 as it is moved linearly by the threaded shaft 44.

Lateral movement of the guide 12 may be monitored by a two-phase tachometer. In FIG. 2 the position sensing for the tachometer is accomplished by a disk 54 which is monitored by transducers 55 in mount 56. The disk 54 might contain magnetic marks, in which case the transducers 55 would consist of two magnetic read heads. Alternatively, disk 54 might have transparent and opaque areas, in which case the transducers 55 would be a photocell. A light source would be placed on the other side of the disk 54 opposite the photocells. For a two-phase tachometer, two tracks on disk 54 are used, with each track being monitored by a read head in the transducer assembly 56. The electronics of the two-phase tachometer are in the skew error correction network 26 of FIG. 1, which will be described hereinafter in more detail. The two-phase tachometer is used herein as it is able to detect changes in direction as well as distance moved.

At this point, before proceeding to the electronics of the skew error correction network, a discussion of prior art problems when changing guide spacing to correct skew error, and the actual operative result obtained by the present invention, will be reviewed. In addition, a possible explanation for why this invention is able to correct for skew error without track distortion will be reviewed. It should be emphasized, however, that high-density recording with a rotating head using air bearing support and flying heads at the present state-of-the-art is not completely understood. It may be that factors other than those discussed herein significantly contribute to the successful operation making up this inventive combination.

THEORETICAL BACKGROUND FOR DISTORTION-FREE SKEW ERROR CORRECTION

As stated earlier under discussion of prior art, it is known that when tape is wrapped 360° helically about a stiff cylindrical bearing, there is one natural angle at which the tape will wrap the cylindrical bearing or mandrel without distorting its shape or the shape of any track the tape carries. Any departure from this angle when wrapping a stiff bearing mandrel caused the tape to distort due to unequal tension distributions across its width. This in turn causes track distortion for tracks on the tape. Since the natural angle is related to the spacing between the entry and exit guides for the tape as it enters and exits the mandrel, it was well accepted in the art that guide spacing could not be changed from the natural angle to correct skew error without also causing distortion of tracks previously written on the tape.

Figure 3A:
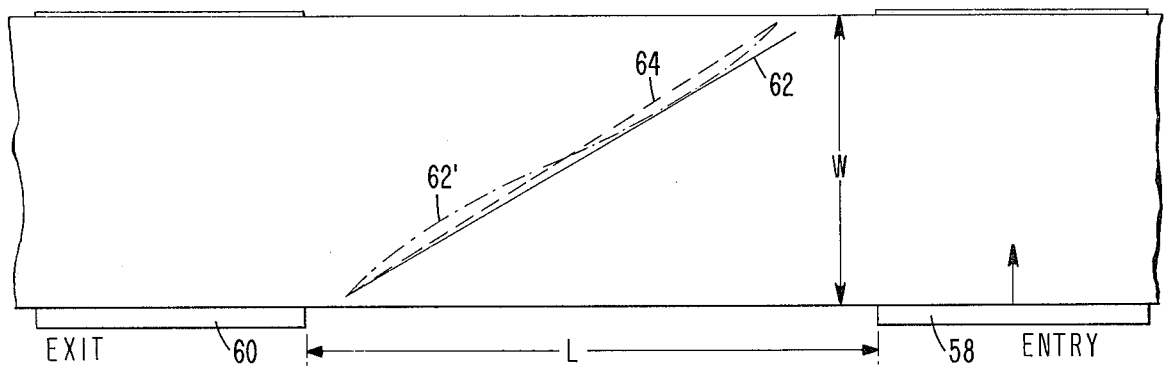
FIGS. 3a and 3b show distortion normally induced in a track where there is a low L to W ratio, and the spacing between entry and exit guides is changed from the normal spacing for helical wrap. To more clearly indicate the position of the track on the tape, the tape has been unwrapped from a rotating-head mandrel and laid flat.
Figure 3B:
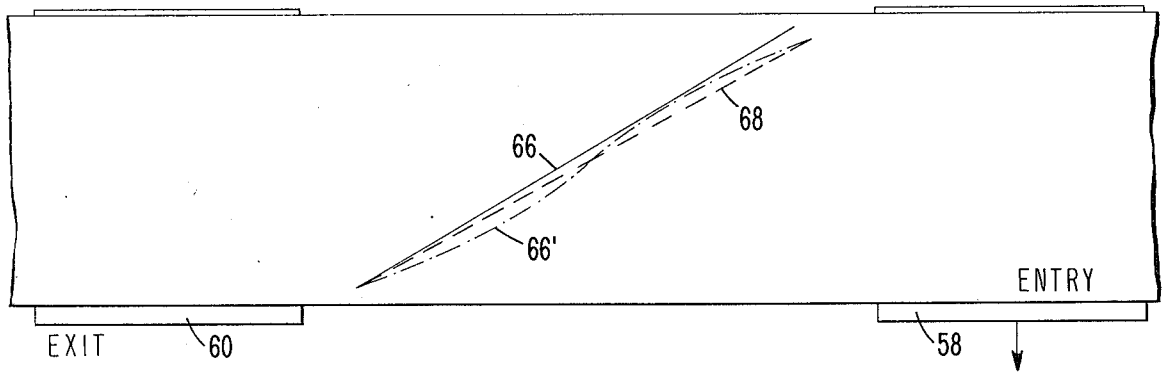

The track distortion caused by a change in guide spacing in the environment of helically wrapping tape about a stiff bearing mandrel is depicted in FIGS. 3a and 3b. To more clearly indicate the path of the track on the tape, the tape has been unwrapped from the mandrel and laid flat. The positions of the entry and exit guides are shown relative to the tape.

Also in FIG. 3a the dimensions L and W in calculating the L to W ratio discussed herein are shown. L is the length between the entry and exit guides, and W is the width of the tape. As stated earlier, typical L to W ratios in the rotating-head magnetic recording art are 20:1 or even 30:1. With such a high ratio, changes in guide spacing do not materially affect track distortion in the tape. However, in the environment of the present invention where the L to W ratio is more in the range of 5:1 to 10:1, a change in guide spacing introduces non-uniform tape tension and thus track distortion along the path of the rotating head when the tape is wrapped about a stiff bearing mandrel.

In FIG. 3a, tape 10 is moving right to left from an entry guide 58 onto the mandrel where the oblique tracks are written or read and then to an exit guide 60. Solid line 62 represents the actual position of the track while dashed line 64 represents the path of the rotating head. The angle between solid line 62 and dashed line 64 represents the skew error. The skew error might be caused by changes in the dimensions of the tape, or by slight differences in the geometry of the tape drives whereby the track written by one tape drive is not parallel to the path of the rotating head in another tape drive.

To correct the skew angle entry guide 58 would be moved up, which would have the effect of decreasing the guide spacing $G_s$ (see FIG. 1). However, when a stiff bearing mandrel is used instead of simply rotating track 62 to a position overlaying track 64, the movement of the guide causes track 62 to distort. The actual shape of track 62 as a result of moving entry guide 58 would be that of dashed line 62'. Distorted track 62' makes an S curve that criss-crosses the path 64 of the rotating head.

The offset skew error condition and track distortion when using a stiff bearing mandrel is shown in FIG. 3b. In this case the track 66 is positioned above the path of the rotating head indicated by dashed line 68. Accordingly, to correct this skew error between track 66 and the path 68, entry guide 58 would be moved down which would increase the guide spacing $G_s$. However, because of the low length to width ratio, and because of the stiff bearing mandrel, track 66 instead of simply rotating also distorts. Distorted track 66 is represented by dashed line 66'. Distorted track 66' makes an S curve again criss-crossing the path of the rotating head 68.

For clarity of illustration, the amount of skew error and the amplitude of the track distortion in FIGS. 3a and 3b has been exaggerated. For high track densities, wherein the track width is in the order of 15 mils and the tracks are immediately adjacent each other with no spacing between tracks, the actual problems in reading previously written tracks are well represented by the exaggerated distortions shown in FIGS. 3a and 3b.

In a typical environment with 15 mil wide tracks, a read head might be 8 mils wide. This would allow 3½ mils on either side of the path of the read head as a margin for skew error or pitch/position error. With the present invention, a 6 inch track has been rotated about one of its ends to the extent that the other end of the track moves approximately ± 5 mils about a zero skew position. The shape of the track for different guide spacings $G_s$ is graphed in FIG. 4.

Figure 4:
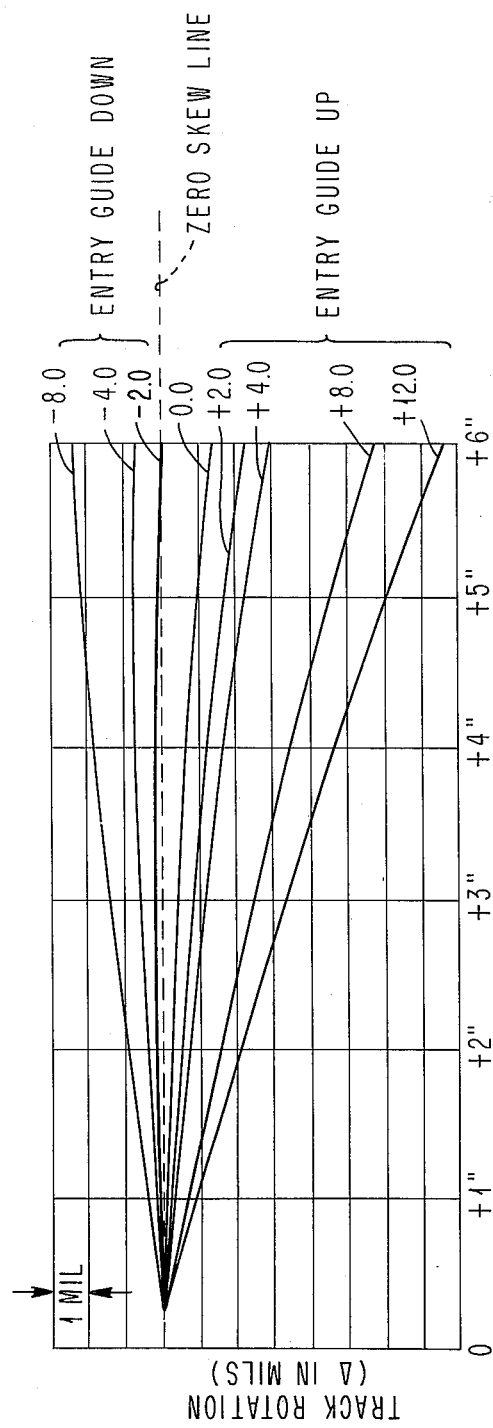
FIG. 4 is a graph showing that with the apparatus and method of this invention, a track on a magnetic tape may be rotated approximately ± 5 mils about a zero skew line without distorting the track.

In the graph of FIG. 4, the horizontal axis is the distance along the track relative to the exit tape guide that does not move. Accordingly, the left end of the track is substantially unmoved as the track rotates due to the entry guide being moved up or down. The vertical axis of the graph in FIG. 4 is the change in mils of a point on the track. The track is graphed for different positions of the entry guide.

As can be clearly seen from FIG. 4, as the entry guide is moved from 12 mils up to 8 mils below the natural or zero skew position, the track rotates without distorting. Of further interest in graph 4 is the fact that the zero skew line or path of the rotating head does not align with track when the entry guide is at the zero skew position. In other words, the drive upon which the data was taken had a slight amount of built-in skew error. In this drive the negative 2 mil guide down position would be preset into the entry guide position to bring the track into parallelism and alignment with the path of the rotating head.

Assuming for example that as discussed immediately above, the track width is 15 mils and the read head width is 8 mils, the advantages of a dynamic skew error correction entry guide are apparent. Without such a guide, the read head may wander only 3½ mils off center line position before erroneous data will be picked up. With a dynamic skew error correction guide that could move the track 5 mils either direction about the path of the rotating head, the read head would have to move 8½ mils laterally as it scanned down the length of the track before it would read erroneous data. Accordingly, because of the dynamic skew error correction, the lateral skew error tolerance in 6 inches of track length has been increased from 3½ mils to 8½ mils. In other words, almost 2½ times greater skew error can be tolerated with dynamic skew error correction than can be tolerated without skew error correction.

The dynamics of the inventive combination whereby a change in guide spacing may be used to correct for a skew error without causing track distortion is not completely understood. However, one possible explanation is diagrammed in FIG. 5 which is a representation of a cutaway of the tape being supported over the air bearing mandrel. The mandrel's radius is Rm. Tape 10 is supported on an air bearing above the mandrel surface 70 by an air bearing. The air bearing is provided by air pressure supply $P_s$ inside the mandrel forcing air through the holes 72 in the surface 70 of the mandrel. Pressure $P_{F1}$ between the tape 10 and the surface of the mandrel is given by the expression $P_F = T/R$, where T is the tape tension and R is the radius of curvature of the tape as it wraps the mandrel. Thus, $P_{F1}$ is equal to $T_1$ divided by $R_1$ in FIG. 5.

Figure 5:
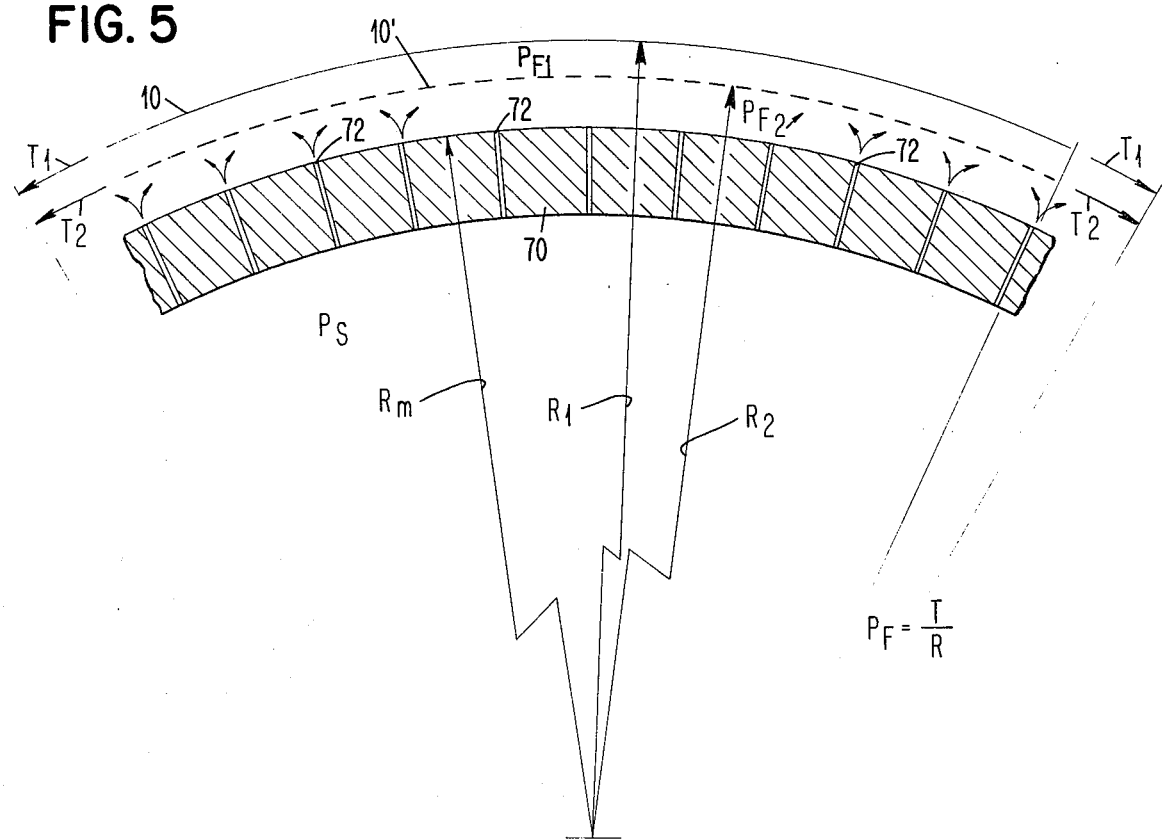
FIG. 5 is a diagram of pressures and forces involved in providing air bearing support to the tape as it passes over the rotating-head mandrel.

If tension were to increase in the tape, tape 10 would then seek a new equilibrium position as represented by dashed line 10' in FIG. 1. The pressure between the tape 10' and the surface of the mandrel would be $P_{F2}$ and would be equal to $T_2$ divided by $R_2$ as shown in FIG. 5. Since $T_2$ is greater than $T_1$ and $R_2$ is less than $R_1$, the pressure $P_{F2}$ would be higher than a pressure $P_{F1}$ when tape 10 is riding further above the surface of the mandrel.

It appears from this physical analysis of equilibrium position for the tape that if there were a non-uniform tension distribution across the width of the tape as, for example, caused by a change in the guide spacing $G_s$, then the tape would tend to seek different equilibrium positions across the width of the tape by adjusting its radius of curvature. In other words, instead of the tape carrying internal forces that would tend to stretch and distort it, the tape tends to merely change its flying height above the surface of the mandrel.

Very slight changes in flying height above the mandrel do not harm the flying height characteristics relative to the head because the head itself and the rotor assembly that carries the head are designed to penetrate into the tape and generate their own controlled air bearings to control flying height between head and tape. Control of flying height relative to a rotor and a flying head mounted on the rotor is described in copending commonly assigned U.S. Pat. application Ser. No. 488,341, filed July 15, 1974.

DESCRIPTION OF SKEW ERROR CORRECTION NETWORK

Figure 6:
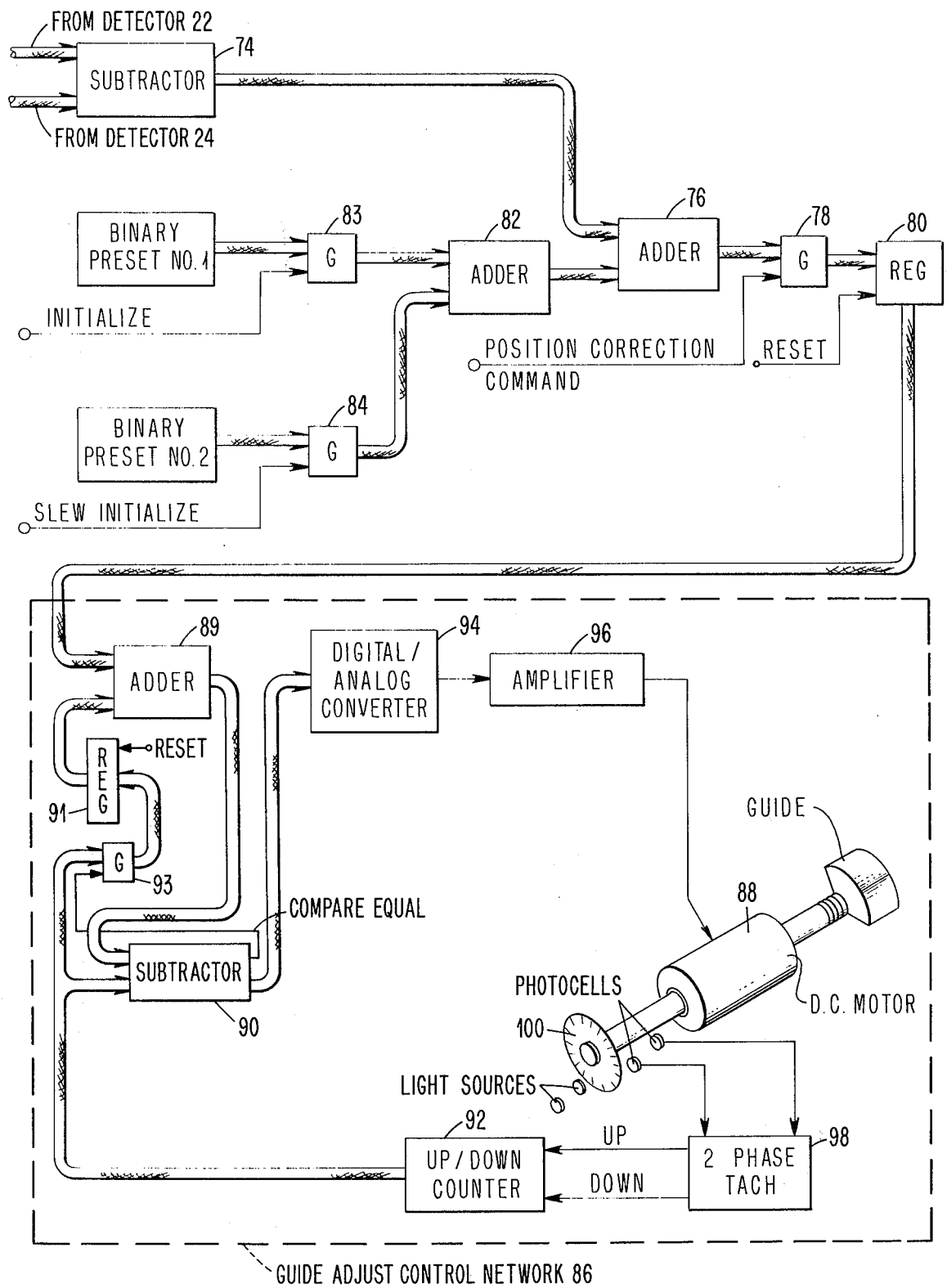
FIG. 6 shows one preferred embodiment for implementing the skew error correction network of FIG. 1, including a guide adjust control network utilizing a D.C. motor to move the guide.

Referring now to FIG. 6, one preferred embodiment for implementing the skew error correction network is shown. The skew error correction network 26 of FIG. 1, and as detailed in FIG. 6, monitors skew error by monitoring the counts received from the head track alignment detectors 22 and 24. Subtractor 74 takes the difference between the two counts produced by the alignment detectors and generates a positive or negative correction count representative of the skew error. The sign of the correction count from the subtractor 74 will be defined such that a positive difference means the entry guide should be moved up while a negative difference count means the entry guide should be moved down (see FIG. 4).

The correction count for the skew error is passed by adder 76 to a gate 78 to be loaded into a register 80 until the guide adjust control network is ready to use the correction. Register 80 is updated periodically by gating in the correction with a position correction command that enables gate 78.

Adders 76 and 82 are provided to add in preset counts if desired. Binary Preset Number 1 may be used to compensate for built-in mechanical skew error caused by the mounting hardware that positions the guides relative to the rotating-head mandrel. Gate 83 is enabled once each time the rotating-head tape drive is initialized. The initialize pulse enables the gate 83 to pass the Binary Preset Number 1 count to register 80 via adders 76 and 82.

Binary Preset Number 2 may be used to feed in a count to operate the drive in a slew mode. In other words, a fixed skew error would be defined by the Binary Preset Number 2 which would change the angle of the tape and thus the angle of the track when the tape drive switched from a stop mode to a slew mode operation.

Normally the tape would be operating in a stop mode operation where the tape is stopped each time a track is scanned by the rotating head. However, when slew mode operations begin, a slew initialize pulse would enable gate 84 to pass the Binary Preset Number 2. This preset count adds in a slew correction when the tape moves continuously as the rotating head scans the tracks on the tape.

Adder 82 adds the fixed counts from Binary Preset Number 1 and Binary Preset Number 2 if present, and passes them to adder 76. Adder 76 adds the preset error counts to the dynamic skew error correction from subtraction 74 and passes the total error correction to gate 78. When gate 78 is enabled by the Position Correction Command (PCC), register 80 is loaded with the error correction count. The preset error counts are only added in once during the first PCC. Thereafter the PCC would only gate dynamic skew error corrections from subtractor 74 to register 80.

The guide adjust control network 86 in FIG. 6 utilizes a D.C. motor 88 for the guide adjust motor 28 in FIG. 1. When the Position Correction Command (PCC) loads a new correction into register 80, adder 89 adds the correction to the present position count from up/down counter 92. The sum gives a new desired position for the entry guide. Subtractor 90 takes the difference between the new position for the entry guide from adder 89 and the present position of the entry guide as given by the up/down counter and stored in register 81. This difference is converted by the digital to analog converter 94 to a D.C. signal. The D.C. signal is amplified by amplifier 96 and used to drive the D.C. motor to move the entry guide.

Two-phase tachometer network 98 monitors signals from the tachometer disk 100 to detect the direction and distance moved by the guide. If the guide is moved up, the two-phase tach has a signal on its up output line causing the up/down counter to increase its count. If the guide moves down, the two-phase tach 98 would have a signal on its down output line causing the up/down counter 92 to count down.

As the count from the counter 92 begins to approach the new position for the guide, the difference produced by subtractor 90 decreases, and the drive to the D.C. motor decreases. When the count from counter 92 matches the new position count, subtractor 90 has zero output. The D.C. motor is no longer driven and the guide is properly positioned to compensate for the skew error and binary presets, if any. At this time subtractor 90 also generates a pulse on its compare equal output line to enable gate 93. Gate 93 loads the new position count from counter 92 into register 91.

To prepare the skew error correction network to begin correction for another block of data (a plurality of oblique data tracks), the registers 80 and 91 are reset to zero by their respective reset lines. Subtractor 90 would produce a difference count to move the guide to zero skew position. As the guide approaches zero position, the up/down counter 92 would count down to zero.

The initialize pulses for gates 83 and 84 would be coincident with the first Position Correction Command (PCC) during the next read/write operation. One possible timing implementation for the PCC would be during the dead time of the rotation cycle for the head. The dead time is time interval after the rotating head has left the edge of tape and before the head enters the tape again to read the next track. If the PCC were timed in this manner, servo data from one track could be used to generate the skew error correction count for the next track.

Figure 7:
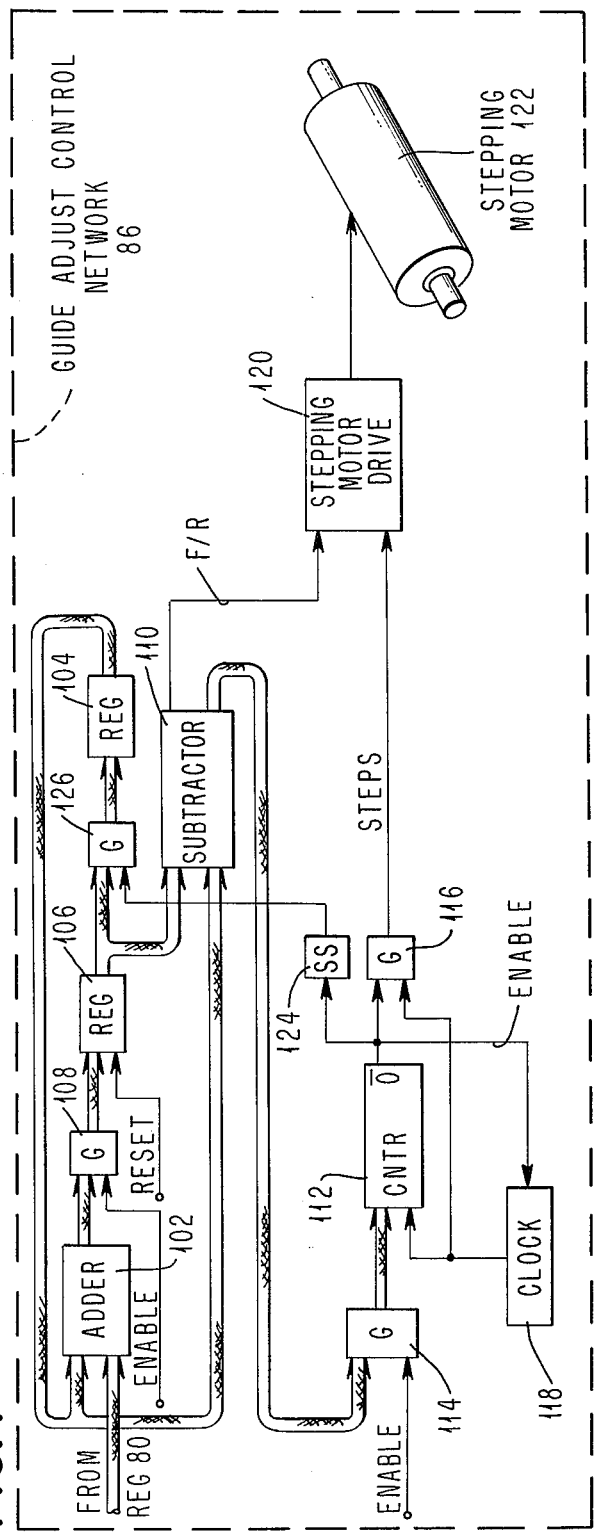
FIG. 7 shows an alternative guide adjust control network for FIG. 6 implemented with digital circuits and using a stepping motor to move the guide.

In FIG. 7 an alternative guide adjust control network 86 is shown which uses a stepping motor to move the entry guide. Adder 102 receives the correction count from register 80 of FIG. 6. To this correction count adder 102 adds the present position of the entry guide as defined by a present position count from register 104. Accordingly, the output of the adder 102 is the new or desired position for the entry guide as specified by a count. This new position count is loaded into register 106 when gate 108 is enabled. A signal that might be used to enable gate 108 would be the trailing edge of the Position Correction Command (PCC) previously described with reference to FIG. 6.

The new position count from adder 102 is also passed to subtractor 110 which subtracts the present position count from the new position count. This gives an adjust count which is passed to counter 112 when gate 114 is enabled. Gate 114 could be enabled by the trailing edge of the Position Correction Command (PCC) in the same manner that gate 108 was enabled. With the adjust count loaded into counter 112, the not-zero line out of counter 112 will come up enabling gate 116 and enabling clock 118. Clock pulses from the clock are then passed by the gate 116 to the stepping motor drive to advance the stepping motor one step for each clock pulse. The same clock pulses are used to count down the adjust count in counter 112.

The forward or reverse direction for the stepping motor drive 120 is picked up from the positive or negative sign of the adjust count calculated by subtractor 110. If the adjust count is positive, the stepping motor 122 is driven in the direction to move the entry guide up, and thus decrease the guide spacing (see FIG. 1). If the sign of the adjust count is negative, stepping motor 122 is rotated in a direction to move the entry guide down and thereby increase the guide spacing.

When the counter 112 has been counted down by the clock pulses to a count of zero, the not-zero output line from counter 112 will go down. Thus, gate 116 is inhibited and clock 118 is turned off. At the same time, single shot 124 converts the transition from up level to down level by the zero output line from counter 112 to a single shot pulse. This pulse enables gate 126 to pass the new position count to register 104. Register 104 is thus loaded with the new position and now the present position of the entry guide.

To reset the skew error correction network after a read/write operation of a data block and in preparation for the next read/write operation, a reset signal is applied to register 80 (FIG. 6) and register 106 of FIG. 7. With register 106 reset to zero, and register 104 holding the present position count for the entry guide, subtractor 110 would subtract the present position from zero. This would produce an adjust count that would return the entry guide to the zero skew error position.

A signal slightly delayed from the reset signal would then enable gate 114 to load this reset adjust count into counter 112. The guide adjust control network 86 in FIG. 7 would then operate as just described to count the adjust control count down to zero and move the entry guide a distance corresponding to the adjust count. This would return the entry guide to the zero error position.

Also, as soon as the not-zero line from the counter 112 transitioned from the up level to the down level at the end of the count down operation, single shot 124 would enable gate 126. Gate 126 would then load the zero count from register 106 into register 104. This would complete the resetting of the skew error correction network.

ALTERNATIVE ENTRY GUIDE EMBODIMENT

Figure 8:
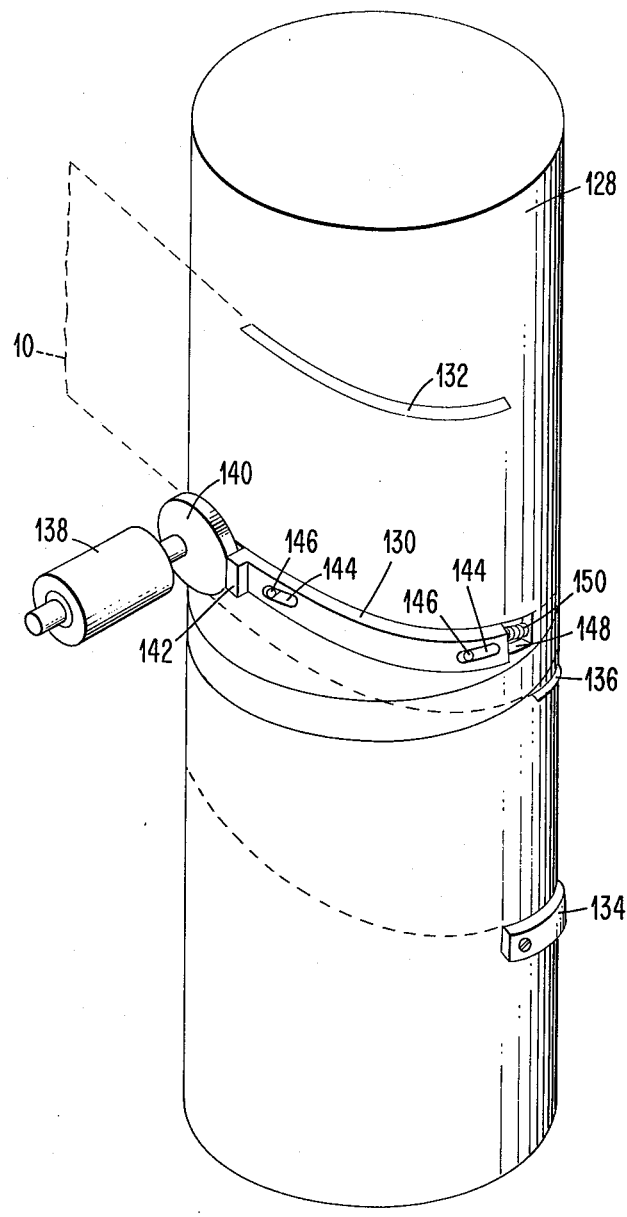
FIG. 8 shows an alternative preferred embodiment wherein the tape wraps the mandrel 540°, and the adjustable entry guide and the fixed exit guide are mounted on the mandrel.

In FIG. 8 the tape has been wrapped 540° about the rotating-head mandrel. In the additional 180 degrees of wrap, an adjustable entry guide has been placed in the first 90° of the 540° wrap, and a fixed exit guide has been placed in the last 90° of the 540° wrap. In FIG. 8 only the entry of the tape onto the mandrel can be seen. The exiting of the tape from the mandrel is hidden on the back side of the mandrel.

In the first 90° of wrap on the mandrel 128, the tape 10 is guided by an entry guide. The entry guide consists of adjustable rigid guide 130 and compliant edge guide 132.

The tape leaves the adjustable entry guide, wraps the mandrel 360°, and enters the fixed exit guide. The fixed exit guide is made up of fixed rigid edge guide 134 and continuous compliant guide 136. Only a position of the guides 134 and 136 are seen, since they wrap about the back side of the mandrel 128. Guides 134 and 136 would extend for about 90° of wrap. At the end of that wrap, the tape 10 would leave the mandrel 128.

The continuous compliant guides 132 and 136 could be constructed in the manner of those shown in copending commonly assigned Pat. application Ser. No. 335,609, filed Feb. 26, 1973, now U.S. Pat. No. 3,850,358. In particular, the pneumatic implementation of the long continuous compliant guide might be used to implement guides 132 and 136. The function of these guides 132 and 136 is that they should provide the same lateral force to the edge of the tape, irrespective of deflection of the guides.

Adjustability of the entry guide is accomplished by motor 138 which rotates cam 140. As cam 140 rotates, it will push against the flange end 142 of edge guide 130. Edge guide 130 has slots 144 that lie in planes perpendicular to the axis of the mandrel 128. Slots 144 engage pins 146 that are fixed to the mandrel. Accordingly, as cam 140 rotates, guide 130 moves around the mandrel 128 and at the same time the tape edge guiding portion of the guide 130 moves in a direction parallel to the axis of the mandrel 128. Edge guide 130 moves in groove 148 in mandrel 128 as it is pushed by the cam 140. Groove 148 is wide enough to let the guide 130 move parallel to the axis of the mandrel 128. Spring 150 in groove 148 keeps flange 142 of guide 130 in contact with cam 140. Movement of guide 130 is equivalent to moving the entry guide 12 of FIG. 1 up or down as previously described.

Other possible implementations of the adjustable guide to correct skew angle might include moving both an entry and exit guide simultaneously to change skew angle. In such a system the entry and exit guides would probably be moved differentially. Differential movement would amount to the entry and exit guides being adjusted laterally simultaneously but in opposite directions to make a skew error correction.

Yet another alternative for lateral displacement of the entry and exit guides would be to use one guide to correct for positive skew error and the other guide to correct for a negative skew error. In such an implementation, the logic for controlling the motion of the guides would have to monitor the position of both guides. For example, if one guide were at a positive position, and the skew error was a negative correction, the negative correction would be made by negative movement of the positively positioned guide until the guide reached its neutral or zero position. If this negative movement of the positively positioned guide did not fully compensate for the skew error, then negative movement by the guide designed to handle negative skew error would commence.

While the invention has been particularly shown and described with reference to preferred embodiments thereof, it will be understood by those skilled in the art that various changes in form and details may be made therein without departing from the spirit and scope of the invention. In particular, it will be appreciated that other hardware implementations of the adjustable guides and other logical control circuits for controlling the movement of guides might be used to implement the skew error correction in a rotating-head tape drive.

What is claimed is:

1. Apparatus for dynamically correcting lack of parallelism between oblique tracks on tape and path of rotating head in a rotating-head magnetic recording device where the unguided length of tape about the head relative to the width of the tape is a ratio less than 10 to 1, said apparatus comprising:
    tape entry and tape exit guides for edge guiding the tape as the tape respectively enters and leaves the region of the head path whereby the guide spacing between the reference edge of the entry guide and the reference edge of the exit guide defines the angle of the tracks on the tape;
    at least one of said tape entry or tape exit guides being laterally adjustable to change the guide spacing while both guides are mounted at a fixed angle relative to the axis of the head path;
    means for detecting lack of parallelism between the head path and the tracks on the tape;
    means connected to said detecting means for generating a skew error correction signal indicative of the angular difference between the tracks on tape and the head path;
    means connected to said generating means for dynamically adjusting the guide spacing of said guiding means in accordance with the skew error correction signal so that the angular difference between the tracks on tape and the head path is reduced substantially to zero.

2. The apparatus of claim 1 wherein:
    said tape exit guide has a reference edge fixedly mounted relative to the head path;
    said tape entry guide has a reference edge movable for lateral adjustment relative to the reference edge of said tape exit guide.

3. The apparatus of claim 2 wherein each of said tape exit guide and said laterally adjustable tape entry guide comprises a long continuous compliant guide having a continuous rigid edge guide for the reference edge and a substantially continuous compliant guide at the opposite edge of the tape to urge the tape against the reference edge of said guides.

4. The apparatus of claim 1 wherein said correction signal generating means comprises:
    means for subtracting head-to-track misalignment detected by said detecting means at one edge of tape from head-to-track misalignment detected by said detecting means at the other edge of tape whereby the difference indicates the lack of parallelism between the head path and the track on the tape.

5. The apparatus of claim 4 and in addition:
    means for adding a preset value to the skew error correction signal where the preset value corresponds to fixed skew error due to the geometry of the rotating-head magnetic recording device whereby each magnetic recording device will record tracks on the tape at the same oblique angle.

6. The apparatus of claim 4 and in addition:
    means for adding a preset value to the skew error correction signal when the recording device switches between a tape stationary mode operation and a tape slew mode operation.

7. In a rotating head magnetic recording device having head-to-track alignment detecting means for detecting the pitch or positional error and the skew error between the data track and the head path, and having means for moving the tape in response to the pitch error from said detecting means to center the head path with the data track, apparatus for dynamically changing the data track angle relative to the head path in response to the skew error, said apparatus comprising:
    a soft bearing mandrel flanking both sides of the rotating head for supporting the tape in the region of the head path;
    entry and exit guides adjacent the region of the head path for guiding the tape as the tape enters and exits the region of the head path;
    means responsive to the skew error for changing the lateral separation of said entry and exit guides without changing the mandrel axis angle relative to said entry and exit guides whereby the angle of the tape is changed in the region of the head path and the data track is aligned with the head path;

said soft bearing mandrel distributing tape tension uniformly across the tape width, when lateral separation of said entry and exit guides is changed by said changing means, whereby the data track can be aligned with the head path without introducing distortion in the data track.

8. Apparatus of claim 7 wherein said entry and exit guides are long continuous compliant guides with each guide having a long continuous rigid reference edge, a long continuous compliant edge for urging the tape continuously against the reference edge, and air bearing support along the continuous guide;

said long continuous compliant entry and exit guides assisting said soft bearing mandrel in distributing the tape tension uniformly across the tape width when the lateral separation of said entry and exit guides is changed by said changing means.

9. The apparatus of claim 8 wherein said entry and exit guides are mounted adjacent said mandrel where the tape enters and exits the mandrel respectively.

10. The apparatus of claim 8 wherein said entry and exit guides are mounted on the mandrel before and after the region of the head path respectively.

11. The apparatus of claim 7 wherein said exit guide is fixedly mounted at the exit end of the region of the head path while said entry guide is on a movable mount positioned at the entry end of the region of the head path.

12. The apparatus of claim 7 wherein said changing means comprises:

motive means for increasing or decreasing the separation between the entry and exit guides;

means connected to said alignment detecting means for computing a correction signal from the skew error detected by said alignment detecting means;

means connected to said computing means for driving said motive means a distance and direction corresponding to the correction signal;

said motive means changing the separation between the entry and exit guides and thereby changing the angle of the tape in the region of the head path.

13. The apparatus of claim 12 wherein said computing means comprises:

digital adders, subtractors and logic for generating a digital correction signal.

14. The apparatus of claim 13 wherein said motive means comprises:

a stepping motor connected to said driving means and responsive thereto for increasing or decreasing the separation between the entry and exit guides in accordance with the digital correction signal.

15. The apparatus of claim 12 wherein said computing means comprises:

digital adders, subtractors and logic for generating a digital correction signal;

digital to analog conversion means for converting the digital correction signal to an analog correction signal.

16. The apparatus of claim 15 wherein said motive means comprises:

a D.C. motor connected to said driving means and responsive thereto for increasing or decreasing the separation of the entry and exit guides in accordance with the analog correction signal.

17. Method for dynamically correcting skew error between the data track on magnetic tape helically wrapped about the path of a rotating head with entry and exit guides at the entry and exit of the helical wrap comprising the steps of:

detecting misalignment between the head path and the previous data track;

calculating the skew error from the detected misalignment;

adjusting the entry and exit guides in response to the skew error to change the helix angle of the tape about the head path, said adjusting step being performed during the portion of the rotating cycle when the magnetic head is between data tracks whereby the present data track is dynamically adjusted for skew error based upon detected misalignment between the head path and the previous data track;

said adjusting step further comprising the steps of:

holding one of the guides at a fixed position;

moving the other guide laterally to change the guide spacing between the entry and exit guide reference edges so that the helix angle of the tape about the head path is changed without changing the head path axis angle relative to said entry and exit guides.

18. The method of claim 17 and in addition the steps of:

extending the helical wrap for a predetermined distance before and after the head path;

mounting the entry guide in the helical wrap before the head path and mounting the exit guide in the helical wrap after the head path;

moving the entry or exit guide along the axis of the rotating head, effectively changing the axial distance the tape moves as the tape wraps the path of the rotating head, and thus changing the helix angle of the tape about the rotating head.

19. The method of claim 17 and in addition the steps of:

adding preset counts to the detected misalignment where said preset counts correspond to fixed mechanical skew in the tape drive or a change in operation of the tape drive between the tape stationary mode and the tape slew mode.

* * * * *

UNITED STATES PATENT OFFICE
CERTIFICATE OF CORRECTION

PATENT NO. : 3,943,566
DATED : March 9, 1976
INVENTOR(S) : George W. Brock, Ernest P. Kollar and Michael L. Nettles It is certified that error appears in the above-identified patent and that said Letters Patent are hereby corrected as shown below:

| | |
|---|---|
| Col. 1, line 29 | change "in" to --is--. |
| Col. 1, line 53 | after "slew mode" insert --recording-- and after "stop mode" delete --recording--. |
| Col. 4, line 58 | after "be" insert --a--. |
| Col. 6, line 44 | "3,845,500" should be --3,850,358--. |
| Col. 10, line 61 | "81" should be --91--. |
| Col. 12, line 55 | "position" should be --portion--. |
| Col. 13, line 36 | "the guide" should be --that guide--. |

Signed and Sealed this

Sixth Day of July 1976

[SEAL]

Attest:

RUTH C. MASON
Attesting Officer

C. MARSHALL DANN
Commissioner of Patents and Trademarks